US011492525B2

(12) United States Patent
Piwowar et al.

(10) Patent No.: US 11,492,525 B2
(45) Date of Patent: Nov. 8, 2022

(54) ADHESIVE FORMULATION

(71) Applicants: DDP SPECIALTY ELECTRONIC MATERIALS US, LLC, Wilmington, DE (US); DDP SPECIALTY ELECTRONIC MATERIALS US 8, LLC, Wilmington, DE (US)

(72) Inventors: Alan M. Piwowar, Collegeville, PA (US); Andrew R. Kneisel, Auburn Hills, MI (US); Lirong Zhou, Auburn Hills, MI (US); Michael R. Golden, Waterford, MI (US)

(73) Assignees: DDP SPECIALTY ELECTRONIC MATERIALS US, LLC, Wilmington, DE (US); DDP SPECIALTY ELECTRONIC MATERIALS US 8, LLC, Wilmington, DE (US)

( * ) Notice: Subject to any disclaimer, the term of this patent is extended or adjusted under 35 U.S.C. 154(b) by 111 days.

(21) Appl. No.: 16/640,760

(22) PCT Filed: Jul. 20, 2018

(86) PCT No.: PCT/US2018/043029
§ 371 (c)(1),
(2) Date: Feb. 21, 2020

(87) PCT Pub. No.: WO2019/055129
PCT Pub. Date: Mar. 21, 2019

(65) Prior Publication Data
US 2021/0189201 A1 Jun. 24, 2021

Related U.S. Application Data

(60) Provisional application No. 62/557,227, filed on Sep. 12, 2017.

(51) Int. Cl.
*C09J 163/00* (2006.01)
*B32B 37/12* (2006.01)
(Continued)

(52) U.S. Cl.
CPC ........... *C09J 163/00* (2013.01); *B32B 15/011* (2013.01); *B32B 15/012* (2013.01);
(Continued)

(58) Field of Classification Search
CPC ...... C09J 163/00; C09J 2301/312; C09J 5/00; C09J 9/00; C09J 11/08; B32B 15/011;
(Continued)

(56) References Cited

U.S. PATENT DOCUMENTS 3,686,359 A    8/1972  Soldatos et al.
4,293,665 A *  10/1981 Zalucha ................... C09J 5/02
                                                        525/255

(Continued)

FOREIGN PATENT DOCUMENTS

EP          0197892         10/1986
EP          0308664          3/1989
(Continued)

OTHER PUBLICATIONS

H. Neuder, C. Sizemore, M. Kolody, R. Chiang and C.-T. Lin, "Molecular design of in situ phosphatizing coatings (ISPCs) for aerospace primers," Progress in Organic Coatings, vol. 47, pp. 225-232, 2003.).

(Continued)

*Primary Examiner* — Cynthia L Schaller (57) ABSTRACT

An adhesive composition including an epoxy-based adhesive polymer and a phosphorous element-containing compound; a process for making the adhesive composition; a process for increasing the corrosion resistance property of the adhesive composition; and a process for bonding a metal (Continued)

substrate with the adhesive composition to increase the corrosion resistance of the substrate by at least 40 percent.

7 Claims, 3 Drawing Sheets (51) Int. Cl.
*C08K 3/32* (2006.01)
*B32B 15/01* (2006.01)
*B32B 15/08* (2006.01)

(52) U.S. Cl.
CPC ............ *B32B 15/016* (2013.01); *B32B 15/08* (2013.01); *B32B 37/12* (2013.01); *B32B 2037/1269* (2013.01); *B32B 2250/02* (2013.01); *C08K 3/32* (2013.01); *C09J 2301/312* (2020.08)

(58) Field of Classification Search
CPC ..... B32B 15/012; B32B 15/016; B32B 15/08; B32B 37/12; B32B 2037/1269; B32B 2250/02; C08K 3/32
See application file for complete search history.

(56) References Cited

U.S. PATENT DOCUMENTS

| | | | |
|---|---|---|---|
| 4,467,071 A * | 8/1984 | Dawdy | C09J 4/00 525/122 |
| 4,701,378 A | 10/1987 | Bagga et al. | |
| 4,734,332 A | 3/1988 | Bagga et al. | |
| 4,943,604 A | 7/1990 | Okuri et al. | |
| 5,112,932 A | 5/1992 | Koenig et al. | |
| 5,191,029 A | 3/1993 | DelDonno | |
| 5,202,390 A | 4/1993 | Mulhaupt et al. | |
| 5,248,559 A | 9/1993 | Okui et al. | |
| 5,278,257 A | 1/1994 | Mulhaupt et al. | |
| 5,322,870 A | 6/1994 | Lin | |
| 7,297,748 B2 | 11/2007 | Trivedi | |
| 9,441,117 B2 | 9/2016 | Schultz et al. | |
| 9,816,002 B2 | 11/2017 | Wang et al. | |
| 2005/0070634 A1 | 3/2005 | Lutz et al. | |
| 2005/0209401 A1 | 9/2005 | Lutz et al. | |
| 2006/0276601 A1 | 12/2006 | Lutz et al. | |
| 2016/0017192 A1* | 1/2016 | Lutz | C08K 3/36 525/107 |

FOREIGN PATENT DOCUMENTS

| | | |
|---|---|---|
| EP | 1498441 | 1/2005 |
| EP | 1728825 | 12/2006 |
| EP | 1916269 | 4/2008 |
| EP | 1916270 | 4/2008 |
| EP | 1916272 | 4/2008 |
| EP | 1916285 | 4/2008 |
| JP | 06-306345 A | 11/1994 |
| JP | 08-109247 A | 4/1996 |
| WO | 2005118734 | 12/2005 |
| WO | 2006128722 | 12/2006 |
| WO | 2007003650 | 1/2007 |
| WO | 2012091842 | 7/2012 |
| WO | 2013142440 A2 | 9/2013 |
| WO | 2017044359 | 3/2017 |

OTHER PUBLICATIONS

M. Witten and C.-T. Lin, "Coating Performance of Polyester-Melamine Enamels Catalyzed by an in Situ Phosphatizing Reagent on Aluminum," Ind. Eng. Chem. Res., vol. 38, pp. 3903-3910, 1999.
JP06-306345, Machine translation.
JP08-109247, Machine translation.

* cited by examiner

ADHESIVE FORMULATION

FIELD

The present invention is related to an epoxy-based structural adhesive formulation for bonding, for example, metal substrates.

BACKGROUND

Corrosion resistance or corrosion inhibition is an important property for a metal substrate to exhibit especially when the metal substrate will be exposed to the elements. Aluminum (Al) is commonly used in the manufacture of automobiles in the automotive industry; and typically, aluminum metal is bonded with an adhesive to another substrate during the manufacture of the automobile. In addition to adhesive strength, corrosion resistance (or corrosion inhibition) is an important property that is desired by the automotive industry to be incorporated into a structural adhesive formulation. The long service life of vehicles demands that the adhesive maintains the bond for many years. During this time, the vehicle and the adhesive are exposed to changes in temperature as well as to water, oils, salts, dirt and other contaminants. These conditions can weaken the adhesive. Accordingly, an adhesive formulation providing increased corrosion resistance is very desirable for use, for example in the automotive industry, for bonding a metal substrate such as aluminum to other metals or other dissimilar substrates.

It is already known in the industry that corrosion resistance and adhesive strength improvements can be obtained for organic coatings on metal substrates when organophosphates or inorganic phosphates are used as described in M. Witten and C.-T. Lin, "Coating Performance of Polyester-Melamine Enamels Catalyzed by an in Situ Phosphatizing Reagent on Aluminum," *Ind. Eng. Chem. Res.*, vol. 38, pp. 3903-3910, 1999; and H. Neuder, C. Sizemore, M. Kolody, R. Chiang and C.-T. Lin, "Molecular design of in situ phosphatizing coatings (ISPCs) for aerospace primers," *Progress in Organic Coatings*, vol. 47, pp. 225-232, 2003.) In the above references, the term in situ phosphatization (ISP) is used to describe a process for increasing the corrosion resistance of a coating formulation. This ISP process is also described in U.S. Pat. No. 5,322,870 by C.-T. Lin, entitled "Additive package for in situ phosphatizing paint, paint and method", and granted 21 Jun. 1994. All of the above references are incorporated herein by reference. The above literature references are directed to investigating in situ phosphatizing reagents (ISPR) in paints on mild steel. The above M. Witten and C.-T. Lin reference also indicates that adding an ISPR (e.g. aryl phosphonic acid) to a polyester-melamine enamel coating on aluminum improved adhesive strength relative to a control after saltwater immersion tests.

Some patents and academic articles indicate that corrosion resistance can be improved with the use of organic and inorganic phosphates. For example, U.S. Pat. No. 5,191,029 describes the use of a phosphorous-containing polymer composition containing water-soluble polyvalent metal compounds. The above patent teaches a "polymer composition comprising (a) one or more polymer(s) containing pendant and/or terminal phosphorus groups . . . to give improved solvent resistance, chemical resistance, print resistance, corrosion resistance and adhesion to metal".

For example, U.S. Pat. No. 7,297,748 B2 indicates that there is some benefits of phosphoric acid and organophosphates for improving corrosion resistance. The above patent describes a direct-to-metal coating containing acrylic polyol with a phosphated monomer to improve adhesion and corrosion resistance. The above patent describes the use of a two-component approach involving a high monoester polyalkylene oxide acrylate phosphate ester and polyisocyanate.

It is highly desirable to provide a one-part structural epoxy adhesive that bonds strongly to metals and other substrates, and which exhibits good corrosion resistance.

SUMMARY

The present invention is directed to an adhesive composition providing increased metal substrate corrosion resistance properties and to a process for increasing the corrosion resistance property of an adhesive composition by incorporating a low level of a phosphorous element-containing (PEC) additive to the adhesive composition.

One embodiment of the present invention is directed to one-component adhesive composition including (I) an epoxy-based adhesive polymer resin composition; and (II) a PEC compound. In one preferred embodiment, the epoxy-based adhesive polymer can be a composition or mixture including: (a) a curable epoxy compound or a combination of two or more curable epoxy compounds; (b) one or more reactive urethane group- and/or urea group-containing polymers having a number average molecular weight of up to 35,000, at least one polyether and/or diene rubber segment having a weight of at least 1,000 atomic mass units, and capped isocyanate groups; (c) at least one epoxy curing catalyst; and (d) a curing agent.

Another embodiment of the present invention is directed to a process for making the above adhesive composition.

Still another embodiment of the present invention is directed to a process for increasing the corrosion resistance property of the adhesive composition.

And yet another embodiment of the present invention is directed to a process for bonding a metal substrate the above structural adhesive composition.

One objective of the present invention is to provide an improved product useful in metal adhesives by improving the corrosion resistance for an aluminum substrate bound to an epoxy-based structural adhesive without altering the initial product properties of the aluminum or the adhesive.

DETAILED DESCRIPTION

In one general embodiment, the present invention includes an adhesive composition including (I) an epoxy-based adhesive polymer resin composition; and (II) a phosphorous element-containing compound (PEC).

The epoxy-based adhesive polymer composition, component (I), useful in the present invention includes a curable polymer composition containing at least the following components: (a) a curable epoxy compound or a combination of two or more curable epoxy compounds; (b) one or more reactive urethane group- and/or urea group-containing polymers having a number average molecular weight of up to 35,000, at least one polyether and/or diene rubber segment having a weight of at least 1,000 atomic mass units, and capped isocyanate groups, (c) at least one epoxy curing catalyst, and (d) a curing agent.

The epoxy-based adhesive polymer resin composition useful in the present invention may include a curable epoxy compound and combinations of two or more curable epoxy compounds. Useful epoxy resins useful in the present invention include liquids, solids, and mixtures thereof. Epoxy compounds are epoxy resins which can be monomeric (e.g., the diglycidyl ether of bisphenol A, diglycidyl ether of bisphenol F, diglycidyl ether of tetrabromobisphenol A, novolac based epoxy resins, and tris-epoxy resins); higher molecular weight resins (e.g., the diglycidyl ether of bisphenol A advanced with bisphenol A); or polymerized unsaturated monoepoxides (e.g., glycidyl acrylates, glycidyl methacrylate, allyl glycidyl ether, and the like) to homopolymers or to copolymers. Epoxy compounds contain, on average, at least one pendant or terminal 1,2-epoxy group (i.e., a vicinal epoxy group) per molecule. Solid epoxy resins that may be used in the present invention are mainly based upon bisphenol A. A preferred solid epoxy resin useful in the present invention may include a diglycidyl ether of bisphenol A such as D.E.R. 664 UE solid epoxy commercially available from Olin Corporation. Other suitable epoxy resins useful in the present invention may include, for example, D.E.R. 331, D.E.R. 332, D.E.R. 383, D.E.R. 431 and D.E.R.736, all commercially available from Olin.

The adhesive contains at least one epoxy resin, component (a) that is non-rubber-modified and is non-phosphorus-modified. By "non-rubber-modified", it is meant that, prior to curing, the epoxy resin is not chemically bonded to a rubber as described below. By "non-phosphorus-modified", it is meant that, prior to curing the adhesive, the epoxy resin has not been reacted with phosphoric acid, a polyphosphoric acid, a phosphoric or polyphosphoric acid salt, or a phosphoric acid or polyphosphoric acid ester, to introduce into the resin structure one or more moieties having the following structure:

If only a single non-rubber-modified, non-phosphorous-modified epoxy resin is present, the epoxy resin is a liquid at 23 degrees Celsius (° C.). If two or more non-rubber-modified, non-phosphorous-modified epoxy resins are present, the mixture thereof is a liquid at 23° C., although individual epoxy resins within the mixture may be by themselves solids at 23° C.

A wide range of epoxy resins can be used as a non-rubber-modified, non-phosphorous-modified epoxy resin, including those described at column 2 line 66 to column 4 line 24 of U.S. Pat. No. 4,734,332, incorporated herein by reference. The epoxy resin should have an average of at least 1.8, preferably at least 2.0, epoxide groups per molecule. The epoxy equivalent weight may be, for example, 75 to 350, 140 to 250 and or 150 to 225. If a mixture of non-rubber-modified, non-phosphorus-modified epoxy resins is present, the mixture should have an average epoxy functionality of at least 1.8, preferably at least 2.0, and an epoxy equivalent weight as in the previous sentence, and more preferably each epoxy resin in the mixture has such an epoxy functionality and epoxy equivalent weight.

Suitable non-rubber-modified, non-phosphorus-modified epoxy resins useful in the present invention include diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols such as the diglycidyl ethers of $C_{2-24}$ alkylene glycols; polyglycidyl ethers of phenol-formaldehyde novolac resins (epoxy novolac resins), alkyl substituted phenol-formaldehyde resins, phenol-hydroxybenzaldehyde resins, cresol-hydroxybenzaldehyde resins, dicyclopentadiene-phenol resins and dicyclopentadiene-substituted phenol resins; and any combination of any two or more thereof.

Suitable epoxy resins useful in the present invention include diglycidyl ethers of bisphenol A resins such as are sold by Olin Corporation under the designations D.E.R.® 330, D.E.R. 331, D.E.R. 332, D.E.R. 383, D.E.R. 661 and D.E.R. 662 resins.

Epoxy novolac resins can also be used in the present invention. Such epoxy novolac resins include for example D.E.N.® 354, D.E.N. 431, D.E.N. 438 and D.E.N. 439 which are commercially available from Olin Corporation.

Other suitable non-rubber-modified, non-phosphorus-modified epoxy resins useful in the present invention are cycloaliphatic epoxides. A cycloaliphatic epoxide includes a saturated carbon ring having an epoxy oxygen (O) bonded to two vicinal atoms in the carbon ring, as illustrated by the following structure:

wherein R is an aliphatic, cycloaliphatic and/or aromatic group and n is a number from 1 to 10, preferably from 2 to 4. When n is 1, the cycloaliphatic epoxide is a monoepoxide. Di- or polyepoxides are formed when n is 2 or more. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins useful in the present invention include oxazolidone-containing compounds as described in U.S. Pat. No. 5,112,932. In addition, an advanced epoxy-isocyanate copolymer such as those sold commercially as D.E.R. 592 and D.E.R. 6508 can be used.

In some embodiments, the non-rubber-modified, non-phosphorus-modified epoxy resin includes a first diglycidyl ether of a bisphenol that has an epoxy equivalent weight of up to 225 and a second diglycidyl ether of a bisphenol that has an epoxy equivalent weight of greater than 225 to 750. The first diglycidyl bisphenol ether may be by itself a liquid at 23° C. and the second may be by itself a solid at 23° C., provided the mixture is a liquid at that temperature. Each of these may be diglycidyl ethers of bisphenol-A or bisphenol-F, which may be partially advanced to obtain epoxy equivalent weights as indicated.

Component (a) may constitute at least 20 weight percent (wt %), at least 30 wt % or at least 40 wt % of the total weight of the adhesive, and may constitute up to 80 wt %, up to 70 wt % or up to 60 wt % of the total weight of the adhesive.

Component (b) is one or more reactive urethane group- and/or urea group-containing polymers having a number average molecular weight of up to 35,000, at least one polyether or diene rubber segment having a weight of at least 1,000 atomic mass units, and capped isocyanate groups. Useful such materials are described, for example, in U.S. Pat. Nos. 5,202,390, 5,278,257, WO 2005/118734, WO 2007/003650, WO2012/091842, U. S. Published Patent Application No. 2005/0070634, U. S. Published Patent Application No. 2005/0209401, U. S. Published Patent Application 2006/0276601, EP-A-0 308 664, EP 1 498 441A, EP-A 1 728 825, EP-A 1 896 517, EP-A 1 916 269, EP-A 1 916 270, EP-A 1 916 272 and EP-A-1 916 285, all of which are incorporated herein by reference.

Component (b) materials are conveniently made in a process that includes the steps of forming an isocyanate-terminated polyether and/or diene rubber and capping the isocyanate groups with a phenol or polyphenol. The isocyanate-terminated polyether and/or diene rubber is conveniently made by reacting a hydroxyl- or amine-terminated polyether, a hydroxyl- or amine-terminated diene rubber, or a mixture of both, with an excess of a polyisocyanate to produce adducts that have urethane or urea groups and terminal isocyanate groups. If desired, the isocyanate-terminated polyether and/or diene rubber can be chain-extended and/or branched simultaneously with or prior to performing the capping reaction.

The isocyanate-terminated polyether or isocyanate-terminated diene polymer can have aromatic or aliphatic isocyanate groups. The polyisocyanate used in preparing this material preferably has at least 2 isocyanate groups per molecule and a molecular weight of up to 300 grams per mole (g/mol). The polyisocyanate may be an aromatic polyisocyanate such toluene diamine or 2,4'- and/or 4,4'-diphenylmethane diamine, or an aliphatic polyisocyanate such as isophorone diisocyanate, 1,6-hexamethylene diisocyanate, hydrogenated toluene diisocyanate, hydrogenated methylene diphenylisocyanate ($H_{12}MDI$), and the like.

The hydroxyl- or amine-terminated polyether may be a polymer or copolymer of one or more of tetrahydrofuran (tetramethylene oxide), 1,2-butylene oxide, 2,3-butylene oxide, 1,2-propylene oxide and ethylene oxide, with polymers or copolymers of at least 70 wt %, based on the total weight of the polymer or copolymer, of tetrahydrofuran, 1,2-butylene oxide, 2,3-butylene oxide and 1,2-propylene oxide being preferred. Polymers of at least 80 wt % tetrahydrofuran, based on the total weight of the polymer or copolymer, are especially preferred. The starting polyether preferably has 2 to 3, more preferably 2, hydroxyl and/or primary or secondary amino groups per molecule. The starting polyether preferably has a number average molecular weight of 900 to 8,000, more preferably 1,500 to 6,000 or 1,500 to 4,000.

The hydroxyl- or amine-terminated diene polymer preferably has a glass transition temperature, prior to reaction with the polyisocyanate, of no greater than −20° C. and preferably no greater than −40° C. The diene polymer is a liquid homopolymer or copolymer of a conjugated diene, especially a diene/nitrile copolymer. The conjugated diene is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 wt % polymerized unsaturated nitrile monomer, and preferably no more than about 26 wt % polymerized nitrile monomer. The hydroxyl- or amine-terminated diene polymer preferably has 1.8 to 4, more preferably 2 to 3, hydroxyl and/or primary or secondary amino groups per molecule. The starting diene polymer preferably has a number average molecular weight of 900 to 8,000, more preferably 1,500 to 6,000 and still more preferably 2,000 to 3,000.

The isocyanate-terminated polymer is conveniently prepared by the reaction of the foregoing polyisocyanate with the hydroxyl- or amine-terminated polyether and/or hydroxyl- or amine-terminated diene rubber, at a ratio of at least 1.5 equivalents, preferably 1.8 equivalents to 2.5 equivalents or 1.9 equivalents to 2.2 equivalents, of polyisocyanate per equivalent of hydroxyl and/or primary or secondary amino groups on the starting polyether or diene rubber.

The reaction to form the isocyanate-terminated polymers can be performed by combining the starting polyether and/or diene rubber with the polyisocyanate and heating to 60° C. to 120° C., optionally in the presence of a catalyst for the reaction of isocyanate groups with the isocyanate-reactive groups of the polyether or diene polymer. The reaction is continued until the isocyanate content is reduced to a constant value or to a target value, or until the amino- and or hydroxyl groups of the starting polyether or diene polymer are consumed.

If desired, branching can be performed by adding a branching agent into the reaction between the starting polyether or diene polymer and the polyisocyanate, or in a subsequent step. The branching agent, for purposes of the present invention, is a polyol or polyamine compound having a molecular weight of up to 599, preferably from 50 to 500, and at least three hydroxyl, primary amino and/or secondary amino groups per molecule. If used at all, branching agents generally constitute no more than 10 wt %, preferably no more than 5 wt % and still more preferably no more than 2 wt % of the combined weight of the branching agent and the starting polyether or diene polymer. Examples of branching agents useful in the present invention include polyols such as trimethylolpropane, glycerin, trimethylolethane, ethylene glycol, diethylene glycol, propylene glycol, dipropylene glycol, sucrose, sorbitol, pentaerythritol, triethanolamine, diethanolamine and the like, as well as alkoxylates thereof having a number average molecular weight of up to 599, especially up to 500.

Chain extension can be performed if desired by i) incorporating a chain extender into the reaction which forms the isocyanate-terminated polyether and/or diene polymer or ii) reacting the isocyanate-terminated polyether and/or diene polymer with a chain extender before or while performing the capping step. Chain extenders useful in the present invention include polyol or polyamine compounds having a molecular weight of up to 749, preferably from 50 to 500, and two hydroxyl, primary amino and/or secondary amino groups per molecule. Examples of suitable chain extenders useful in the present invention include aliphatic diols such as ethylene glycol, diethylene glycol, triethylene glycol, propylene glycol, dipropylene glycol, tripropylene glycol, 1,4-butanediol, 1,6-hexane diol, cyclohexanedimethanol and the like; aliphatic or aromatic diamines such as ethylene diamine, piperazine, aminoethylpiperazine, phenylene diamine, diethyltoluenediamine and the like, and compounds having two phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, and the like. Among these compounds, the compounds having two phenolic hydroxyl groups are preferred.

The isocyanate groups of the isocyanate-terminated polyether or diene polymer are capped by reaction with a capping agent. Suitable capping agents useful in the present invention are described, for example, in WO 2017/044359, incorporated herein by reference, and include various mono- and polyphenol compounds as described more below, as well as various amine compounds, benzyl alcohol, hydroxy-functional acrylate or methacrylate compounds, thiol compounds, alkyl amide compounds having at least one amine hydrogen such as acetamide, and ketoxime compounds.

In some embodiments, at least 90 percent (%) of the isocyanate groups, more preferably at least 95% of the isocyanate groups, are capped with a monophenol or polyphenol. Examples of monophenols useful in the present invention include phenol, alkyl phenols that contain one or more alkyl groups that each may contain from 1 carbon atom to 30 carbon atoms, a halogenated phenol, cardanol, or naphthol. Suitable polyphenols useful in the present invention contain two or more, preferably two, phenolic hydroxyl groups per molecule and include resorcinol, catechol, hydroquinone, biphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof. In such embodiments, up to 10%, preferably at most 5%, of the isocyanate groups may be capped with other capping agents such as mentioned above.

The capping reaction can be performed under the general conditions described already, i.e., by combining the materials in the stated ratios and allowing them to react at room temperature or an elevated temperature such as 60° C. to 120° C., optionally in the presence of a catalyst for the reaction of isocyanate groups with the isocyanate-reactive groups of the capping agent. The reaction is continued until the isocyanate content is reduced to a constant value, which is preferably less than 0.1% by weight. Fewer than 3%, preferably fewer than 1%, of the isocyanate groups may remain uncapped.

The capping reaction can be performed at the same time the isocyanate-terminated polyether and/or diene polymer is formed, or as a separate capping step.

The resulting component (b) material suitably has a number average molecular weight of at least 3,000, preferably at least 4,000, to about 35,000, preferably to about 20,000 and more preferably to about 15,000, as measured by GPC, taking into account only those peaks that represent molecular weights of 1,000 or more.

The polydispersity (ratio of weight average molecular weight to number average molecular weight) of component (b) is suitably from about 1 to about 4, preferably from about 1.5 to 2.5.

Component (b) may constitute at least 0.5 wt %, at least 2 wt %, at least 5 wt %, at least 10 wt % or at least 15 wt % of the total weight of the adhesive, and may constitute up to 40 wt %, up to 30 wt % or up to 25 wt % of the total weight of the adhesive.

The epoxy curing catalyst, component (c), is one or more materials that catalyze the reaction of the epoxy resin(s) with the curing agent. The epoxy curing catalyst useful in the present invention is preferably encapsulated or otherwise a latent type that becomes active only upon exposure to elevated temperatures. Among preferred epoxy catalysts useful in the present invention are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl) phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. 2,4,6-tris(dimethylaminomethyl)phenol integrated into a poly(p-vinylphenol) matrix (as described in European patent EP 0 197 892), or 2,4,6-tris(dimethylaminomethyl) phenol integrated into a novolac resin, including those described in U.S. Pat. No. 4,701,378.

Component (c) may constitute at least 0.1 wt %, at least 0.25 wt % or at least 0.5 wt % of the total weight of components (a)-(d), and may constitute, for example, up to 5 wt %, up to 3 wt % or up to 2 wt % of the total weight of components (a)-(d).

The curing agent, component (d), useful in the present invention is selected together with component (c) such that the adhesive exhibits a curing temperature of at least 60° C. The curing temperature preferably is at least 80° C., and may be at least 100° C., at least 120° C., at least 130° C. or at least 140° C. The curing temperature may be as high as, for example, 180° C. The "curing temperature" herein refers to the lowest temperature at which the structural adhesive achieves at least 30% of the adhesive's lap shear strength (DIN ISO 1465) at full cure within 2 hours. The lap shear strength at "full cure" is measured on a sample that has been cured for 30 minutes (min) at 180° C., which conditions represent "full cure" conditions. Clean (degreased) 1.2 millimeters (mm) HC420LAD+Z100 galvanized steel substrates, a bond area of 10×25 mm and an adhesive layer thickness of 0.3 mm are suitable parameters for performing the above evaluation.

The curing agent, component (d), is a compound that reacts with at least two epoxy groups to form a linkage between them. Suitable curing agents useful in the present invention include materials such as boron trichloride/amine and boron trifluoride/amine complexes, dicyandiamide, melamine, diallylmelamine, guanamines such as dicyandiamide, methyl guanidine, dimethyl guanidine, trimethyl guanidine, tetramethyl guanidine, methylisobiguanidine, dimethylisobiguanidine, tetramethylisobiguandidine, heptamethylisobiguanidine, hexamethylisobiguanidine, acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenylsulphones. Dicyandiamide, isophthalic acid dihydrazide, adipic acid dihydrazide and/or 4,4'-diaminodiphenylsulphone are particularly preferred for use in the present invention.

Component (d) is present in an amount sufficient to cure the composition. Typically, enough of the curing agent is provided to consume at least 80% of the epoxide groups present in the composition. A large excess over that amount needed to consume all of the epoxide groups is generally not needed. Preferably, the curing agent constitutes at least about 1.5 wt % of the adhesive, more preferably at least about 2.5 wt % and even more preferably at least 3.0 wt %. The curing agent preferably may constitute up to about 15 wt % of the adhesive, up to about 10 wt % thereof, up to about 8 wt %, up to about 7 wt % thereof or up to about 5 wt % thereof.

The weight of components (a)-(d) may constitute, for example, 30 wt % to 100 wt %, 50 wt % to 100 wt %, 50 wt % to 90 wt % or 50 wt % to 85 wt % of the total weight of the adhesive. If components (a)-(d) constitute less than 100% of the total weight of the adhesive, the adhesive may also contain one or more optional ingredients.

The adhesive of the present invention may further contain optional additives such as fillers, tackifiers, toughening agents, flexibilizers, curing catalysts, stable catalysts, color additives, dimerized fatty acids, reactive and/or non-reactive diluents, pigments and dyes, fire-retarding agents, thixotropic agents, expanding agents, flow control agents, adhesion promoters, antioxidants, viscosity modifiers, solvents, corrosion protective agent and glass beads. Suitable expanding agents include both physical and chemical type agents. The adhesive may also contain a thermoplastic powder such as polyvinylbutyral or a polyester polyol, as described in WO 2005/118734. Suitable optional ingredients useful in the adhesive formulation may include both physical and chemical type agents. For example, an ingredient to make the material wash off resistant, or to make the formulation cure at low temperature may be used.

For example, the adhesive formulation of the present invention may contain one or more particulate fillers. The fillers are solids at the temperatures reached in the curing reaction. These fillers perform several functions, such as (1) modifying the rheology of the adhesive in a desirable way, (2) reducing overall cost per unit weight, (3) absorbing moisture or oils from the adhesive or from a substrate to which the adhesive is applied, and/or (4) promoting cohesive, rather than adhesive, failure. Examples of suitable mineral fillers include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds, metal powders such as aluminum powder or iron powder and expandable microballoons. A mixture of filler that includes at least fumed silica and calcium oxide, and which may further include calcium carbonate, kaolin and/or wollastonite, can be used. Particulate fillers may constitute, for example, at least 5 wt %, at least 10 wt % or at least 12 wt % of the total weight of the adhesive; and may constitute up 35 wt %, up to 30 wt %, up to 25 wt % or up to 20 wt % of the total weight of the adhesive. If the mineral fillers include fumed silica, the adhesive may contain up to 10 wt %, preferably 1 wt % to 6 wt % of fumed silica.

All or part of the mineral filler may be in the form of fibers having a diameter of 1 μm to 50 μm (D50, as measured by microscopy) and an aspect ratio of 6 to 20. The diameter of the fibers may be 2 to 30 μm or 2 to 16 μm, and the aspect ratio may be from 8 to 40 or from 8 to 20. The diameter of the fiber is taken as that of a circle having the same cross-sectional area as the fiber. The aspect ratio of the fibers may be 6 or more, such as 6 to 40, 6 to 25, 8 to 20 or 8 to 15.

Alternatively, all or part of the mineral filler may be in the form of low aspect ratio particles having an aspect ratio of 5 or less, especially 2 or less, and a longest dimension of up to 100 μm, preferably up to 25 μm.

One of the benefits of using the epoxy resins in the present invention is the capability of providing a toughened adhesive for structural bonding. The adhesive is advantageously a low viscosity resin at room temperature and thus the adhesive can be applied at room temperature. For example, the toughening systems used as structural adhesives may include Aliphatic-based Urethane Polymer P92-500, Polyurethane Adduct P99-0151, Polyurethane Adduct P15-0346, Polyurethane Adduct EUP27 (P10-0078), Aliphatic-based Urethane Polymer P16-0227 and/or a butadiene-acrylic copolymer. The viscosity of the room temperature pumpable adhesive at 25° C. generally is from about 400 pascal-seconds (Pa·s) at 3 l/s shear rate measured via a rheometer to about 4,000 Pa·s in one embodiment; from about 600 Pa·s to about 2,500 Pa·s in another embodiment; and from about 800 Pa·s to about 1,500 Pa·s in still another embodiment.

In another embodiment, among the optional ingredients useful in the present invention are one or more rubbers. These include, for example, a rubber-modified epoxy resin different from component (a), i.e., a compound having at least two epoxide groups separated by an aliphatic chain of at least 300 g/mol, preferably at least 500 g/mol. The aliphatic chain may be, for example, an alkylene group; an alkenyl group; a diene polymer or copolymer; or a polyether such as a poly(propylene oxide), a poly(ethylene oxide) or a copolymer of propylene oxide and ethylene oxide. Other rubber-modified epoxy resins useful in the present invention include epoxidized fatty acids (which may be dimerized or oligomerized), and elastomeric polyesters that are modified to contain epoxy groups. The rubber-modified epoxy resin may have, prior to curing, a glass transition temperature of −20° C. or lower, preferably −30° C. or lower.

The optional rubber may include core-shell rubber particles provided that if they are present at all, the core shell rubber particles constitute at most 7 wt % of the total weight of the adhesive. Preferably the core-shell rubbers constitute no more than 5 wt %, no more than 2.5 wt % or no more than 1% of the total weight of the adhesive, and may be absent from the adhesive.

Glass microballoons having an average particle size of up to 200 microns and density of up to 0.4 grams per cubic centimeter (g/cc) may be present in the adhesive of the present invention. If present, the glass microballoons can be used in amounts of up to 5 wt % of the total weight of the adhesive, and more preferably up to 2 wt % or up to 1 wt % thereof. Suitable microballoons useful in the present invention include 3M® Glass Bubbles K25, from 3M Corporation. Accordingly, in some embodiment, glass microballons are present in an amount of no greater than 0.5 wt % or no greater than 0.25 wt % of the total weight of the adhesive, and may be absent.

In another embodiment, a monomeric or oligomeric, addition polymerizable, ethylenically unsaturated material is optionally present in the adhesive composition. This material may have a molecular weight of less than about 1,500. This material may be, for example, an acrylate or methacrylate compound, an unsaturated polyester, a vinyl ester resin, or an epoxy adduct of an unsaturated polyester resin. A free radical initiator can be included in the adhesive composition as well, in order to provide a source of free radicals to polymerize this material. The inclusion in the adhesive composition of an ethylenically unsaturated material of this type provides the possibility of effecting a partial cure of the adhesive through selective polymerization of the ethylenic unsaturation.

The epoxy-based resin polymer composition, component (I), is preferably prepared by mixing together the foregoing components prior to adding the PEC compound, component (II). Alternatively, the PEC compound, component (II), can be admixed with the components (a)-(d) to form the adhesive of the present invention.

In one embodiment, the epoxy-based resin polymer composition that may be used in the present invention as component (I) is provided as a separate component prior to adding the PEC compound. In this embodiment, the epoxy-based resin polymer composition may include any number of epoxy-based resin polymer compositions sold under the tradename BETAMATE® and commercially available from The Dow Chemical Company. Some of the specific BETAMATE products useful in the present invention may include, for example, BETAMATE 1620US, BETAMATE 1480V203, BETAMATE 1486, BETAMATE 1489HM, BETAMATE 4601, BETAMATE 6160, BETAMATE 1630US, and BETAMATE 1640US.

The concentration of the epoxy-based resin polymer composition used in the adhesive formulation can be in the range of from about 30 wt % to about 70 wt % based on BETAMATE 1620 US in one embodiment; from about 40 wt % to about 65 wt % in another embodiment; and from about 45 wt % to about 60 wt % in still another embodiment.

The PEC compound useful in the present invention may include, for example, organic and inorganic species. In a preferred embodiment, the phosphorous element in the PEC compound is bound to 1 to 4 oxygen atoms. Representative PEC compounds useful in the present invention may include orthophosphoric acid; polyphosphoric/polyphosphonic acids; derived conjugate bases including phosphates and phosphites; and polymer compositions comprising one or more polymer(s) containing pendant and/or terminal phosphorous groups with phosphorous containing monomers including for example phosphoethylmethacrylate, phosphodi(ethyl methacrylate, and allyl phosphate.

The concentration of the PEC compound in the adhesive formulation can be in the range of from about 0.01 wt % to about 10 wt % in one embodiment; from about 0.1 wt % to about 5 wt % in another embodiment; and from about 0.1 wt % to about 3 wt % in still another embodiment.

The process for making the adhesive composition of the present invention includes admixing the epoxy-based adhesive polymer, component (I), described above and the PEC compound, component (II), described above at room and not exceeding 55° C. and more preferably not exceeding 50° C. The resulting adhesive is a one-component adhesive in which the foregoing components are mixed together prior to being applied and cured. The method of combining the ingredients is not particularly critical, provided that temperatures are low enough that premature curing does not take place. It is important to control the mixing temperature because the excessive heat could adversely affect the shelf life of the product. In addition, the order of addition is carried out, preferably to produce a stable product. For example, in one embodiment, the ingredients are added early and adjusted. In another embodiment, the ingredients are added later to minimize thermal history. For short term exposures to facilitate high volume application, the top temperature of mixing the components together can be increased up to 55° C.

The formulated adhesive can be stored at a temperature of, for example, up to 100° C., up to 80° C., up to 60° C. or up to 40° C. for a period of at least one day prior to the adhesive being applied and cured.

The resulting adhesive composition product of the present invention produced by the above process is a homogenous liquid blend of components. The adhesive product is stable at ambient conditions; and can be readily applied to a substrate. By "stable" it is meant that the adhesive product is flowable at ambient conditions and generally has a viscosity of less than about <1500 Pa·s; and the individual components are inert, i.e., the ingredients when mixed together do not react with each other to provide undesired side products.

Once the formulation of the present invention is prepared as described above, the formulation can be used in various applications. In one broad embodiment of the present invention, the formulation may be used as an adhesive for bonding two substrates. For example, in one embodiment the foregoing adhesive composition can be formed into a layer at a bondline between two substrates to form an assembly, and then the adhesive layer is cured at the bondline to form a cured adhesive bonded to each of the two substrates.

The adhesive of the present invention can be applied to the substrates by any convenient technique. For example, the adhesive formulation of the present invention can be applied to at least a portion of the surface of a substrate by brushing, calendaring, spraying, dipping, rolling or other conventional means. The adhesive can be applied cold or be applied warm if desired. The adhesive can be applied manually and/or robotically, using for example, a caulking gun, other extrusion apparatus, or jet spraying methods. Once the adhesive composition is applied to the surface of at least one of the substrates, the substrates are contacted such that the adhesive is located at a bondline between the substrates.

After application, the adhesive is cured by heating the adhesive to, or above, the adhesive's curing temperature. Although lower temperatures can be used in some instances, particularly when longer curing times can be tolerated, it is generally preferable to perform the curing step by heating the adhesive to at least 130° C. The heating temperature may be as high as 220° C. or more, but as an advantage of the present invention is the lower curing onset temperature, the curing temperature preferably is up to 200° C., up to 180° C., up to 170° C. or up to 165° C.

The adhesive of the present invention can be used to bond a variety of substrates together including for example wood, metal, coated metal, a metal such as steel, zinc, copper, bronze, magnesium, titanium and/or aluminum, a variety of plastic and filled plastic substrates, fiberglass and the like.

The substrates can be different materials. Examples of substrate pairings include pairings of different metals such as steel and aluminum; steel and magnesium; and aluminum and magnesium; pairings of a metal such as steel, magnesium, aluminum or titanium with a polymeric material such as thermoplastic organic polymer or a thermoset organic polymer; and pairing of a metal such as steel aluminum, magnesium or titanium and a fiber composite such as a carbon-fiber composite or a glass fiber composite.

In one preferred embodiment, the adhesive formulation of the present invention can be advantageously used for bonding together the same or dissimilar metal substrates; or for bonding metal to other substrates such as thermoplastic, thermosets, reinforced plastics, or glass. The process for bonding the substrates includes for example the steps of: (A) admixing: (I) an epoxy-based adhesive polymer; and (II) a PEC compound to form a structural adhesive formulation; (B) contacting the formulation from step (A) to at least a portion of the surface of a first substrate prior to contacting the first substrate with another second substrate forming a layer of the adhesive of step (A) at a bondline between the two substrates; the layer in step (B) can have a thickness between 0.1 mm and 3 mm and may contain solid spacers such as glass beads to maintain thickness; (C) contacting the first and second substrates via the layer of the adhesive formulation at the bondline between the two substrates to form an assembly; and (D) curing the adhesive layer at the bondline by heating to a temperature of at least 130° C. to form a cured adhesive bonded to the two substrates at the bondline; wherein the lap shear strength of the adhesive formulation of the present invention, after 500 hours of exposure to 35° C. and 5% NaCl salt spray (ASTM B117-16) is increased by at least about 30 times.

The formulation of the present invention may be used as an adhesive for bonding a first substrate to a second substrate. The first and second substrates can be dissimilar substrates or the first and second substrates may be the same substrates. In one embodiment, the first substrate is selected from metals such as aluminum, and ferrous-based metals such as for example carbon steel. In a preferred embodiment, the first metal substrate is aluminum.

The second substrate can be selected from various types of substrates including, for example, metal such as aluminum and steel, glass, fabric, metal, rubber and composite materials. In a preferred embodiment, the second substrate is another metal such as an aluminum metal.

In one preferred embodiment, the adhesive is used to bond parts of automobiles together or to bond automotive parts onto automobiles. An application of particular interest is bonding of automotive or other vehicular frame components to each other or to other components. Assembled automotive and other vehicular frame members often are coated with a coating material that requires a bake cure. The coating is typically baked at temperatures that may range from 160° C. to as much as 210° C. In such cases, it is often convenient to apply the adhesive to the frame components, then apply the coating, and cure the adhesive at the same time the coating is baked and cured. Between the steps of applying the adhesive and applying the coating, the assembly may be fastened together to maintain the substrates and adhesive in a fixed position relative to each other until the curing step is performed. Mechanical means can be used as a fastening device. These include, for example, temporary mechanical means such as various types of clamps, bands and the like, which can be removed once the curing step is completed. The mechanical fastening means can be permanent, such as, for example, various types of welds, rivets, screws, and/or crimping methods. Alternatively or in addition, the fastening can be done by spot-curing one or more specific portions of the adhesive composition to form one or more localized adhesive bonds between the substrates while leaving the remainder of the adhesive uncured until a final curing step is performed after the coating is applied.

The resulting benefits of the adhesive formulation of the present invention includes, for example, (1) an increase in corrosion resistance for a metal substrate such as an aluminum substrate bound to the epoxy-based structural adhesive; (2) a retention of the bond strength of the adhesive; and (3) the reduction in failure mode after cycles of the adhesive.

The cured adhesive may have a Casson plastic viscosity of at least 25 pascals (Pa), at least 50 Pa or at least 70 Pa, up to 1,000 Pa, up to 700 Pa, up to 400 Pa or up to 200 Pa, at 45° C.

The greater the corrosion resistance property exhibited by an adhesive the better especially when the adhesive is used as a structural adhesive. Performance enhancement in terms of corrosion resistance may be observed as an improvement in lap shear performance of bonded metal substrates (bound together with an adhesive of the present invention) after exposure to accelerated corrosion conditions outlined in ASTM B117-16. For example, lap shear strength can be measured as megapascals (MPa) for an epoxy-based adhesive after 500 hours of salt spray testing using 5 wt % NaCl solution at 35° C.

In general, the corrosion resistance property of an adhesive formulation containing a PEC additive of the present invention may be increased from the original corrosion resistance property of the adhesive without a PEC additive. The corrosion resistance property of the adhesive formulation without a PEC additive is about 0.4 MPa. Generally, the corrosion resistance property, the lap shear strength, of an adhesive formulation of the present invention can be measured at about 32 times higher than 0.4 MPa in one embodiment, about 31 times higher than 0.4 MPa in another embodiment, and about 30 times higher than 0.4 MPa in still another embodiment. In other embodiments, the corrosion resistance property of the adhesive formulation can be from about 18 times higher than 0.4 MPa to about 30 times higher than 0.4 MPa.

As aforementioned, a particular advantage of the present invention is that the adhesive has excellent resistance to corrosive aging; and for purposes of the present invention, resistance to corrosive testing is evaluated by lap shear strength testing per ASTM B117-16. Test samples are prepared as set forth in the following examples. The lap shear strength of unaged test samples is measured. Identical test samples are prepared and exposed to 90 cycles of the Volkswagen PV 1210 corrosion aging protocol and the lap shear strength of the samples is measured. The adhesive of the present invention often exhibits a loss of 40% or less of lap shear strength after the corrosion protocol, compared to the lap shear strength of the unaged samples. In some embodiments, this excellent resistance to corrosive aging is achieved even when the adhesive contains a very small amount (such as 0.75 wt % or less, based on total adhesive weight) of glass microspheres, or even when the adhesive is devoid of glass microspheres.

The cured adhesive in some embodiments exhibits an unaged lap shear strength, measured on test samples prepared as in the following examples, of at least 25 MPa, at least 28 MPa or at least 30 MPa, up to 50 MPa. The lap shear strength after corrosion aging may be at least 16 MPa, at least 17 MPa, at least 18 MPa or at least 20 MPa.

The application of an adhesive of the present invention to a metal substrate is theorized to improve product performance related to corrosion resistance by an in situ cleaning/surface modification of the metal with the phosphate containing additive present in the adhesive.

The cured adhesive forms a strong bond to various substrates. The greater the bonding strength property exhibited by an adhesive the better especially when the adhesive is used as a structural adhesive. Generally, the bonding strength property of the adhesive formulation of the present invention can be greater than at least 15 MPa up to 50 MPa depending of types and stiffness of bonding substrates. In one embodiment, the bonding strength property of the adhesive formulation of the present invention may be from about 10 MPa to about 50 MPa, from about 12 MPa to about 45 MPa in another embodiment, and from about 15 MPa to about 40 MPa in still another embodiment. Advantageously, the bonding strength property of an adhesive formulation containing a PEC additive of the present invention does not decrease from the original corrosion resistance property of the adhesive without a PEC additive. For example, the presence of the phosphorous-containing additive in the formulated adhesive at an amount in the range of from about 0.1 wt % to about 0.5 wt % does not alter the initial adhesive strength of the adhesive compared to an adhesive formulated without the PEC additive of the present invention. In one embodiment, the adhesive strength property of the adhesive does not decrease by greater than about 34%, by greater than from about 20% to about 25% in another embodiment, and by greater than from about 0% to about 5% in the most preferred embodiment.

When used as a structural adhesive, is generally desired for the formulation of the present invention not to fail to bond substrates together. A benefit of using the formulated adhesive of the present invention includes a reduction in the failure mode cycle of the adhesive. Advantageously, the failure mode cycle of an adhesive formulation containing a PEC additive of the present invention is reduced from the original failure mode cycle of the adhesive without a PEC additive. For example, the presence of the PEC additive in the formulated adhesive of the present invention reduces the failure mode cycle of the adhesive compared to an adhesive formulated without the PEC additive to less than about 100% failure between adhesive and substrate in one embodiment, from about 40% to about 60% in another embodiment, and from about 90% to about 100% in still another embodiment.

In the formulated adhesive of the present invention, the presence of the PEC additive at an amount in the range of from about 0.1 wt % to about 0.5 wt % may alter the initial viscosity of the adhesive by increasing the initial viscosity of the adhesive (without the additive) in the range of from about 3% to about 15%. At a 72-hour measurement of viscosity, the initial viscosity of the formulated adhesive of the present invention may increase from about 30% to about 400%. However, the above increases in viscosity do not limit the application of the adhesive of the present invention to metal substrates.

The cured adhesive may have an elastic modulus of at least 800 MPa at least, at least 1,500 MPa or at least 1,800 MPa. The cured adhesive may exhibit a tensile strength of at least 25 MPa or at least 28 MPa. The cured adhesive may have an elongation at break of at least 2%, at least 4% or at least 6%, up to 40%, up to 20%, up to 15% or up to 10%.

As aforementioned, adding a PEC compound to an epoxy-based adhesive polymer increases the corrosion property of the adhesive formulation. In addition, the bonding strength of the adhesive remains the same or does not deteriorate significantly. For example, a low level addition of phosphoric acid (0.1 wt %), QM1326 (0.5 wt %) or SIPOMER® PAM (0.5 wt %) to BETAMATE 1620 US increases corrosion resistance for bound Al 6111. After the 500 hour and 1000 hour corrosion testing, a BETAMATE sample without an additive loses nearly 90% of its lap shear strength on aluminum. With the present invention additive, corrosion tested samples perform significantly better (see Table I).

TABLE I

Accelerated Corrosion Test Lab Shear Results

| Shear Strength (MPa) | As-Received Al6111 | | |
|---|---|---|---|
| | Initial | 500 Hour SST | 1000 Hour SST |
| 1620 control | 16.2 | 0.4 | 2.2 |
| w/0.5% QM-1326AP | 16.6 | 13 | 8.6 |
| w/3% QM-1326AP | 10.7 | 13.1 | 10.3 |
| w/0.1% phosphoric acid | 16.5 | 12.1 | 12.8 |
| w/0.5% PEM monomer | 16.5 | 12.2 | 10.9 |
| w/3% PEM monomer | 12.4 | 7.1 | 10.6 |

It is theorized that the improved lap shear performance after 500 hours of exposure to accelerated corrosion conditions of 3% NaCl salt spray at 35° C. for two metal substrates bound by an adhesive containing the PEC additive of the present invention results from an interaction of the PEC additive with the aluminum substrate and the epoxy resin; and that: (1) the PEC additive cleans/etches the metal surface in situ removing non-native organic contamination from the metal surface thereby improving interactions between active components in the adhesive and the substrate surface; (2) the PEC additive reduces the oxide/hydroxide thickness for the aluminum substrate increasing the interaction between the active components in the adhesive and the metal substrate surface; (3) the PEC additive generates a coating of insoluble metal-phosphorous layer with a thickness ranging from about 0.1 nanometers (nm) to about 7 nm thereby improving interactions between active components in the adhesive and the substrate surface; (4) the PEC additive chemically reacts with at least part of the adhesive formulation including the epoxy functionality of the adhesive polymer resin forming ester bonds which produces new organophosphates which, in turn, may improve interactions between the components in the adhesive formulation and the substrate surface.

EXAMPLES

The following examples are presented to further illustrate the present invention in detail but are not to be construed as limiting the scope of the claims. Unless otherwise stated all parts and percentages are by weight.

Various terms and designations used in the examples are explained hereinbelow.

"PEM" stands for phosphoethyl methacrylate.

"SST" stands for salt spray test.

"Ave" stands for average.

"Stdev" stands for standard deviation.

Al6111 is a grade of aluminum metal that contains 0.7-1.1% silicon, 0.5-1% magnesium, 0.15-0.45% manganese, a maximum of 0.4% Fe, a maximum of 0.15 uranium, a maximum of 0.1% chromium, a maximum of 0.1% titanium, and the remainder aluminum. Al6111 is commercially available from ACT, Hillsdale, Mich.

FERROCOTE® 61 AUS is an automotive approved oil-based rust preventative reagent comprising mineral oil, sulfonic acids, petroleum, and calcium salts. FERROCOTE 61 AUS is commercially available from Quaker Chemical Corporation.

Alcoa 951 is a vinyl phosphonic/phosphinic acid, polyacrylate and commercially available from Arconic.

BETAMATE 1620US is an epoxy structural adhesive based on toughened epoxide chemistry and is commercially available from The Dow Chemical Company. BETAMATE 1620US is based on toughening technology that uses capped polyurethane prepolymers as the primary toughening agent along with conventional toughening agents such as adducts of bisphenol A based epoxies and carboxyl terminated butadiene acrylonitrile (CTBN). BETAMATE is a trademark of The Dow Chemical Company. BETAMATE 1620US alone gives good strength and reasonable failure modes on untreated aluminum in the initial state but very poor results after corrosion testing such as 500 hour to 1000 hour salt spray exposure.

In the examples which follow, three phosphate containing additives were formulated into BETAMATE 1620 US: (1) 85% phosphoric acid; (2) QM1326; and (3) SIPOMER PAM 4000. The additives were formulated into the system on a weight percent basis.

QM1326 is an adhesive product used to improve adhesion to metallic substrates when incorporated into acrylic or styrene acrylic systems. QM1326 is a mixture of phosphoethyl methacrylate (PEM) monoester, PEM diester, phosphoric acid and methyl methacrylate plus monomer impurities. QM1326 is commercially available from The Dow Chemical Company; and generally described in U.S. Pat. No. 5,191,029 issued to Rohm and Haas in 1993.

SIPOMER PAM 4000 is a phosphoethyl methacrylate polymer, and commercially available from Rhodia Solvay Group. SIPOMER PAM-4000 is a trademark of Rhodia Solvay Group.

D.E.R. 331 is a bisphenol A based epoxy resin having an EEW between 182 and 192; and commercially available from Olin Corporation.

Salt spray testing was carried out according to ASTM B117-16 (April 2016). Salt spray samples were put in a salt spray cabinet and exposed for 500 hours and 1000 hours according to ASTM B117-16. The conditions were 35° C. and 5% NaCl solution for the spray.

Oxygen detected on the surface of a metal substrate can be determined using SEM/EDS. "SEM/EDS stands for scanning electron microscopy.

The level of metal elements found in a metal substrate can be documented by XPS. "XPS" stands for X-ray photoelectron microscopy.

Examples 1-10 and Comparative Example A

A series of mixture samples were prepared as described in Table II; and viscosity measurements of the samples were taken in accordance with the viscosity measurement procedure described above. The results of the viscosity measurements are listed in Table II.

TABLE II

| | | Viscosity Changes to D.E.R. 331 After Adding Additive | | |
|---|---|---|---|---|
| Example | Sample Description | Initial Viscosity (Pa · s) | 24 Hour Viscosity (Pa · s) | 72 Hour Viscosity (Pa · s) |
| Comparative A | D.E.R. 331 (100%) | 16.76 | 16.76 | 16.76 |
| 1 | D.E.R. 331 + 0.5 wt % QM1326 | 17.46 | 22.4 | 32.8 |
| 2 | D.E.R. 331 + 1 wt % QM1326 | 15.5 | 23.6 | 33.4 |
| 3 | D.E.R. 331 + 3 wt % QM1326 | 9.4 | 94 | 88 |
| 4 | D.E.R. 331 + 5 wt % QM1326 | 5.66 | 2800 | 2424 |
| 5 | D.E.R. 331 + 0.1 wt % phosphoric acid | 19.52 | 22.64 | 28 |
| 6 | D.E.R. 331 + 0.5 wt % phosphoric acid | 19.18 | 65 | 67.6 |
| 7 | D.E.R. 331 + 1 wt % phosphoric acid | 14.52 | 292 | 150.8 |
| 8 | D.E.R. 331 + 0.5 wt % SIPOMER PAM 4000 | 16.28 | NM* | 21.84 |
| 9 | D.E.R. 331 + 1.5 wt % SIPOMER PAM 4000 | 14.48 | NM* | 35.6 |
| 10 | D.E.R. 331 + 3 wt % SIPOMER PAM 4000 | 12.5 | NM* | 64.8 |

*NM = "not measured"

In the Examples which follow, storage stability of the additives was assessed by mixing solutions of the additives at different weight percent values with D.E.R. 331 bisphenol A based epoxy resin. After mixing, the solutions were put into glass jars, equilibrated in a water bath at 25° C. and then viscosity was measured using a Brookfield Viscometer Model DV-E with a #5 or 7 Spindle and at 0.3-20 rpm. Samples were put into a 43° C. oven for 24 hours and 72 hours and the viscosity were measured again. The results are provided in Table II. These viscosity values indicate that some of the loadings (e.g. 5 wt % QM1326) are unacceptable for further examination due to high viscosity values.

Lap shear tests were conducted according to ASTM D1002-10 (October 2010) Initial lap shear samples were pulled on an Instron Tensile Tester Model 5500R using a 50 kN load cell. Rate of test was 2 in/min (50 mm).

The viscosity of the adhesive tested was measured by a rheometer at the shear rate of 3 1/s at 25° C.

From the results in Table II, it can be seen that adding too much (e.g., greater than about 3 wt %) PEC to the adhesive resin can increase viscosity significantly (more than 3× initial) after 72 hours at 23° C. and can create an unstable solution. Thus, adding too much PEC to the adhesive resin can create instability in BETAMATE 1620 US which contains the adhesive resin. When adding low levels (e.g., less than about 3 wt %) PEC to the adhesive resin, the mixtures appear to be stable. "Stability" herein means<100% viscosity growth; and viscosity is measured by a Brookfield viscometer.

Examples 11-20 and Comparative Example B

A series of formulated adhesive samples and a series of lap shear samples were prepared as described in Table III. Various PECs were added to BETAMATE 1620 US and tested.

TABLE III

Lap Shear Strength for Initial Samples with Various Additive Loadings

| Example | Sample Description | | As-Received Strength (MPa) | Acetone + 61AUS Oil Strength (MPa) | Acetone + Methanol + Hexane Strength (MPa) | Sandpaper + Acetone Strength (MPa) | QM-1326AP + Acetone Strength (MPa) | Alcoa 951 + Acetone Strength (MPa) |
|---|---|---|---|---|---|---|---|---|
| Comparative B | Control | Avg | 16.2 | 15.5 | 17.0 | 18.8 | 17.8 | 24.5 |
| | | stdev | 0.1 | 0.7 | 0.4 | 0.2 | 0.2 | 0.6 |
| 11 | QM-1326AP (0.5%) | Avg | 16.6 | 16.5 | 16.8 | 17.2 | 17.2 | 22.5 |
| | | stdev | 0.1 | 0.1 | 0.5 | 0.2 | 0.1 | 1.9 |
| 12 | QM-1326AP (1%) | Avg | 14.5 | 14.5 | 15.1 | 15.0 | 14.8 | 17.1 |
| | | Stdev | 0.2 | 0.4 | 0.3 | 0.4 | 0.3 | 0.2 |
| 13 | QM-1326AP (3%) | Avg | 10.7 | 10.8 | 11.7 | 11.7 | 11.5 | 12.5 |
| | | Stdev | 0.3 | 0.2 | 0.2 | 0.3 | 0.3 | 0.6 |
| 14 | QM-1326AP (5%) | Avg | 9.6 | 9.3 | 10.2 | 10.6 | 10.0 | 10.1 |
| | | Stdev | 0.6 | 0.2 | 0.1 | 0.3 | 0.7 | 0.3 |
| 15 | Phosphoric acid (0.1%) | Avg | 16.5 | 16.2 | 17.2 | 17.8 | 17.5 | 23.5 |
| | | Stdev | 0.2 | 0.2 | 0.2 | 0.1 | 0.1 | 0.9 |
| 16 | Phosphoric acid (0.5%) | Avg | 15.3 | 15.4 | 15.8 | 15.9 | 15.8 | 17.3 |
| | | Stdev | 0.1 | 0.3 | 0.2 | 0.2 | 0.2 | 0.6 |
| 17 | Phosphoric acid (1%) | Avg | 12.0 | 12.0 | 13.3 | 12.8 | 12.8 | 13.5 |
| | | Stdev | 0.2 | 0.2 | 0.2 | 0.0 | 0.3 | 0.2 |
| 18 | SIPOMER PAM 4000 (0.5%) | Avg | 16.5 | 16.5 | 16.8 | 17.8 | 17.6 | 22.7 |
| | | Stdev | 0.7 | 0.1 | 0.3 | 0.1 | 0.2 | 0.2 |
| 19 | SIPOMER PAM 4000 (1.5%) | Avg | 14.3 | 14.2 | 15.4 | 15.3 | 15.3 | 17.1 |
| | | Stdev | 0.2 | 0.1 | 0.1 | 0.2 | 0.2 | 0.7 |
| 20 | SIPOMER PAM 4000 (3%) | Avg | 12.3 | 12.5 | 13.2 | 13.1 | 12.8 | 13.9 |
| | | Stdev | 0.4 | 0.1 | 0.5 | 0.2 | 0.3 | 0.2 |

In these Examples, an aluminum substrate, untreated Al 6111, was used. The aluminum substrate was supplied pre-cut into 1 inch (25.4 mm) by 4 inches (101.6 mm) strips. The thickness of each of the metal substrate strips was 1 mm. The Al 611 metal was chosen since the metal is a typical automotive grade metal used for closure panels such as the doors and hoods of an automobile. The Al 611 metal is also a good differentiator of adhesives.

The lap shear samples were prepared by first cleaning off the existing mill oil on the surface of the samples with acetone and then applying to the surface of the sample FERROCOTE 61AUS, a common stamping oil used by original equipment manufacturers (OEMs). An adhesive sample was then applied to the lap shear samples by spreading the adhesive over the joining surface of the samples using a spatula. The bond thickness of the adhesive was controlled at 0.25 mm using solid glass beads. The overlap of the joint was controlled at 0.5 inch (12.5 mm) using a bonding fixture. After bonding, the joint was held together by putting binder clips on both sides of the joint. The adhesive was then cured by placing the joints in an oven set at a temperature of 163° C. and heating the joints at 163° C. for 20 min. Replicates of three for each Example in Table III were made for each condition. Lap shear tests were conducted according to ASTM D1002-10.

After cooling the lap shear samples to room temperature (about 25° C.), the initial lap shear samples were pulled on an Instron Tensile Tester Model 5500R using a 50 kN load cell. The rate of the test was 2 inches/min (50 mm/min).

From the results in Table III, it was found that when too great a wt % of PEC is used to adhere Al6111 using BETAMATE 1620 US, the initial lap shear strength decreased relative to a Control. For example, formulating with 3 wt % QM1326 in BETAMATE 1620 US decreases initial lap shear strength by about 35% compared to a Control. On the other hand, when an appropriate amount of PEC is added to BETAMATE 1620 US, the initial lap shear is uninfluenced (see Table III). For example, the initial lap shear for a Control sample of BETAMATE 1620 US is near 16.2 MPa. With an appropriate amount of PEC added to the adhesive, the lap shear value is about 16.5-16.6 MPa.

Examples 21-26 and Comparative Examples C and D

In these Example, a series of salt spray samples described in Table IV and Table V were placed in a salt spray cabinet and exposed for 500 hours as described in Table IV and 1000 hours as described in Table V according to ASTM B117-16. The conditions of the salt spray testing were 35° C. and 5% NaCl solution for the spray. After removal from the cabinet, the salt spray samples were allowed to equilibrate at ambient conditions for 24 hours prior to testing.

Figure 1:
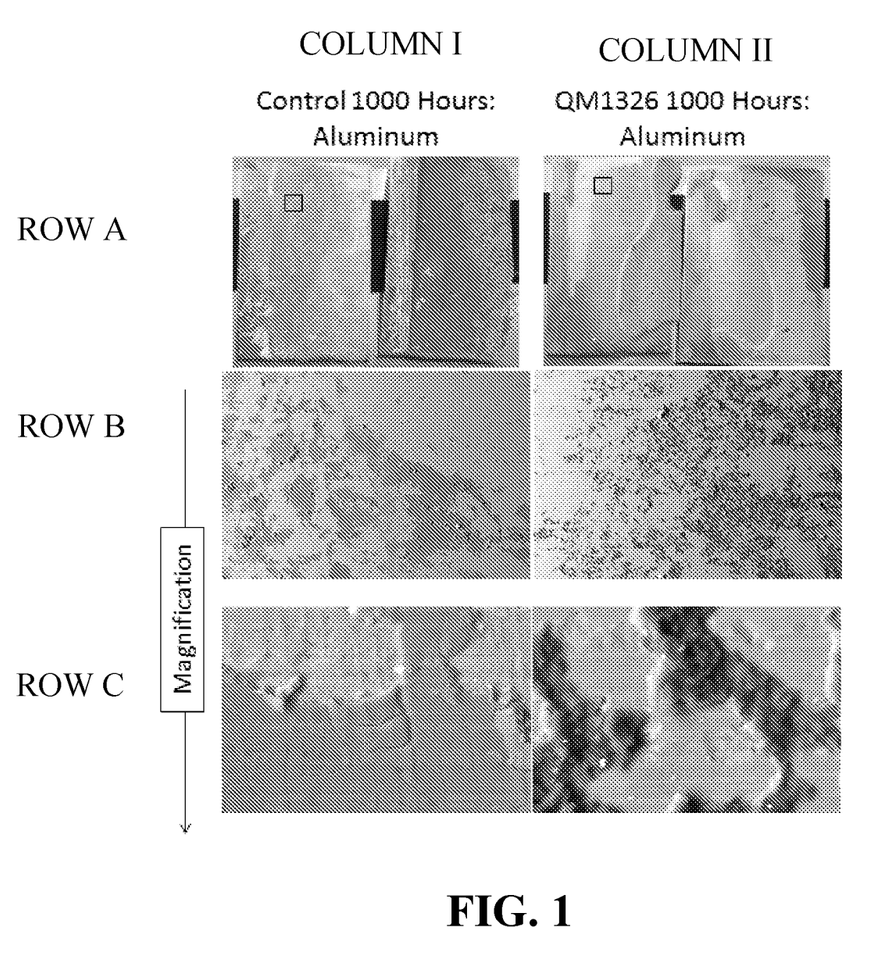
FIG. 1 is a series of images of test samples showing an exposed aluminum surface after lap shear testing including two optical images (top row A) and four electron micrographs (middle row B and bottom row C).

The results of the above testing indicate that when Al6111 is adhered using BETAMATE 1620 US with optimal amounts of PECs and exposed to 500 hours (see Table IV) and 1000 hours (see Table V) salt spray (3 wt % NaCl), systems containing PECs significantly outperform the Control samples in terms of lap shear. For example, at 500 hours exposure the Control sample has a lap shear of near 0.4 MPa while systems formulated with various PECs range from about 12-13 MPa.

from 5 wt % to 10 wt % while the dark regions contain major contributions from Al and O with O ranging from 25 wt % to 60 wt %. For comparison, an initial unexposed reference Al sample can be examined and the Al sample can contain approximately 3 wt % O. Therefore, the exposure of the Control sample to the accelerated corrosion conditions appears to have increased the amount of O (presumably

TABLE IV

Lap Shear Strength for 20 Day Exposed Samples with Additives

| Example | | | As-Received Strength (MPa) | Acetone + FERROCOTE 61AUS Oil Strength (MPa) | Acetone + Methanol + Hexane Strength (MPa) | Sandpaper + Acetone Strength (MPa) | QM1326AP + Acetone Strength (MPa) | Alcoa 951 + Acetone Strength (MPa) |
|---|---|---|---|---|---|---|---|---|
| Comparative C | Control (20 Day) | Avg | 0.4 | 13.3 | 10.7 | 15.9 | 15.2 | 21.8 |
| | | Stdev | 0.3 | 0.6 | 1.4 | 0.4 | 0.3 | 0.8 |
| 21 | 0.5% QM-1326AP (20 Day) | Avg | 13.0 | 13.9 | 13.4 | 12.7 | 8.8 | 20.4 |
| | | Stdev | 0.3 | 0.4 | 2.4 | 1.2 | 3.3 | 0.8 |
| 22 | 0.1% Phosphoric acid (20 Day) | Avg | 12.1 | 7.5 | 8.9 | 12.5 | 14.4 | 19.8 |
| | | Stdev | 2.2 | 3.8 | 1.6 | 3.3 | 0.3 | 1.3 |
| 23 | 0.5% SIPOMER PAM 4000 (20 Day) | Avg | 12.2 | 13.4 | 9.4 | 12.9 | 14.6 | 20.3 |
| | | Stdev | 0.2 | 0.8 | 6.1 | 2.1 | 0.2 | 1.4 |

TABLE V

Lap Shear Strength for 40 Day Exposed Samples with Additives

| Example | Sample Description | | As-Received Strength (MPa) | Acetone + FERROCOTE 61AUS Oil Strength (MPa) | Acetone + Methanol + Hexane Strength (MPa) | Sandpaper + Acetone Strength (MPa) | QM-1326AP + Acetone Strength (MPa) | Alcoa 951 + Acetone Strength (MPa) |
|---|---|---|---|---|---|---|---|---|
| Comparative D | Control (40 Day) | Avg | 2.2 | 12.8 | 14.5 | 12.5 | 13.9 | 21.2 |
| | | Stdev | 2.8 | 2.7 | 20.6 | 3.3 | 1.9 | 0.7 |
| 24 | 0.5% QM-1326AP (40 Day) | Avg | 8.6 | 12.1 | 10.1 | 14.5 | 13.2 | 14.5 |
| | | Stdev | 5.0 | 4.0 | 4.3 | 0.5 | 0.9 | 8.8 |
| 25 | 0.1% Phosphoric acid (40 Day) | Avg | 12.8 | 5.1 | 14.7 | 13.9 | 13.0 | 19.9 |
| | | Stdev | 1.1 | 3.9 | 0.7 | 1.7 | 1.6 | 0.9 |
| 26 | 0.5% PAM SIPOMER 4000 (40 Day) | Avg | 10.9 | 10.0 | 12.4 | 14.2 | 13.7 | 21.1 |
| | | Stdev | 5.6 | 2.1 | 2.7 | 0.6 | 1.8 | 1.3 |

Analytical tests were performed on various samples of BETAMATE 1620 US and the results of such tests are described with reference to FIGS. 1-3.

Analytical Experiment 1

In FIG. 1, there is shown a series of images including two optical images (top row A) and four electron micrographs (middle row B and bottom row C) of test samples of an exposed aluminum surface after lap shear testing of a Control sample (left column I) and a QM1326 formulated BETAMATE 1620 US sample (right column II) exposed to 1000 hours of salt spray (3% NaCl). On the surface of the Control sample, dark and light domains can be observed. The light regions are dominated by Al and O, with O ranging aluminum oxide) at the aluminum surface. By comparison, the QM1326 formulated BETAMATE 1620 US system, when exposed to a 1000 hours salt spray test, appears mostly similar to a sample that has not been exposed to accelerated corrosion conditions, suggesting no major surface modification to the sample. The micrographs in FIG. 1 also show dark regions and light regions. The light regions contain a major contribution of Al and approximately 3 wt % of O, consistent with the initial reference aluminum. The dark regions represent areas with major levels of C, consistent with the presence of adhesive.

The results from the above experiment indicates that a BETAMATE 1620 US Control sample after exposure to accelerated corrosion conditions contains increased amounts of oxygen and aluminum oxide at the surface of the sample which is consistent with oxide formation. The amount of oxygen detected on the surface increased 20× when examined using SEM/EDS. This growth layer exfoliates easily, and is a likely root cause for poor lap shear performance. In comparison, when the adhesive contains an PEC, no signs of accelerated corrosion are observed as shown in FIG. 1.

Analytical Experiment 2

Figure 2:
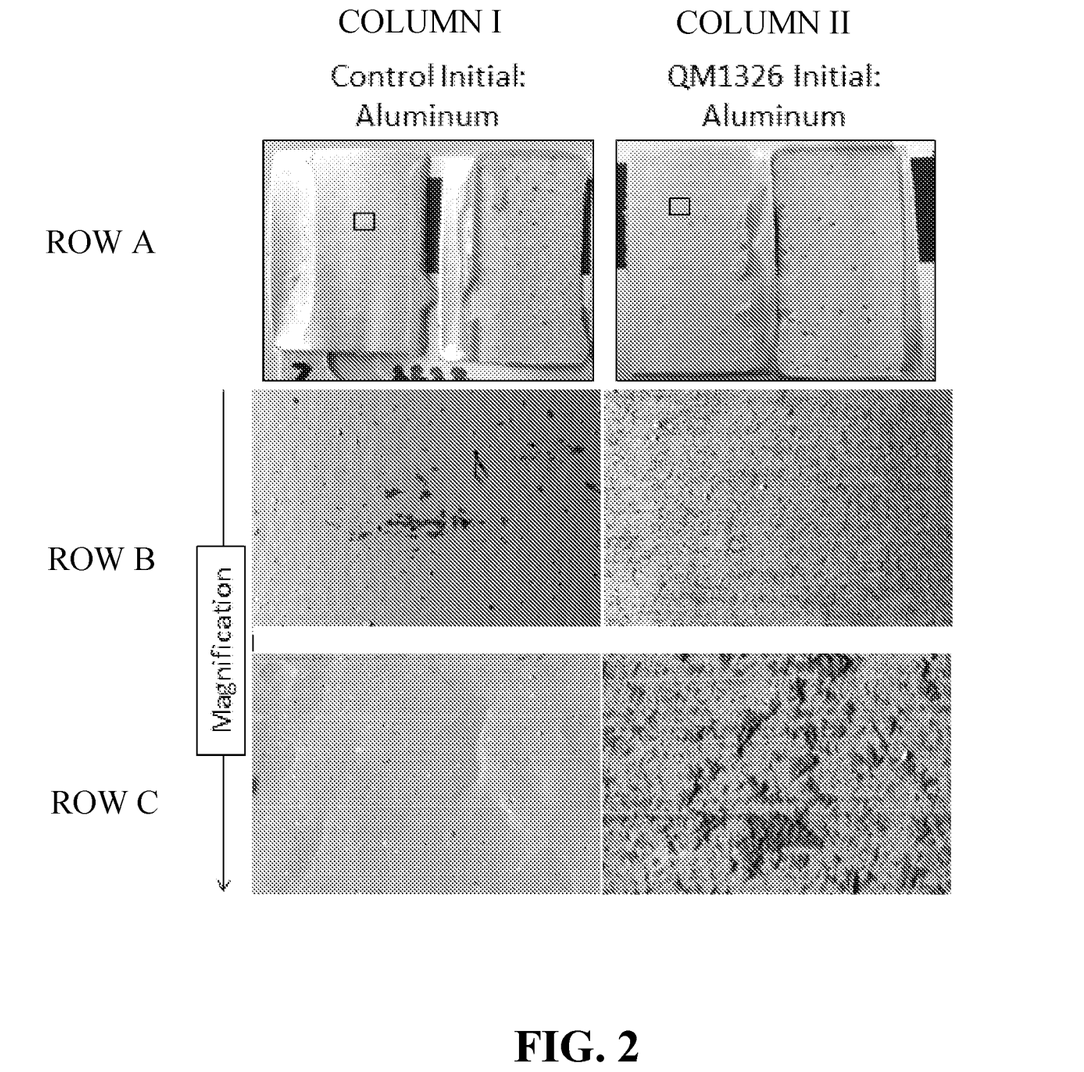
FIG. 2 is a series of images of test samples showing an exposed aluminum surface after lap shear testing including two optical images (top row A) and four electron micrographs (middle row B and bottom row C).

In FIG. 2, there is shown a series of images including two optical images (top row A) and four electron micrographs (middle row B and bottom row C) of test samples of an exposed aluminum surface after lap shear testing for an initial (not exposed to accelerated corrosion conditions) Control sample (left column I) and a QM1326 formulated BETAMATE 1620 US sample (right column II). FIG. 2 shows the surface of the Control sample that is mostly featureless with some dark domains indicating regions of adhesive. The continuous regions contain a major contribution from Al, with about 3 wt % 0, consistent with a reference aluminum sample. In general, the micrographs for this and other regions indicate that the Control sample of BETAMATE 1620 US mainly failed adhesively to the substrate. Lower energy micrographs (e.g., 5 keV; not shown) suggests some residual carbon at the surface of the test samples indicating a lesser degree of cohesive failure or residual stamping oil. By comparison, the QM1326 formulated BETAMATE 1620 US system contains significantly more carbon domains at the surface, consistent with cohesive failure. The images of FIG. 2 indicate that formulating an adhesive with QM1326 alters the failure mode for the initial systems.

The results from the above experiment indicates that the addition of QM1326 to BETAMATE 1620 US changes the failure mode during lap shear testing from mostly adhesive for a Control to mostly cohesive under non-corrosive conditions as shown in FIG. 2. This suggests a modification to the interaction between adhesive and the metal surface. However, this modification does not result in an increase in initial adhesive strength.

Analytical Experiment 3

Figure 3:
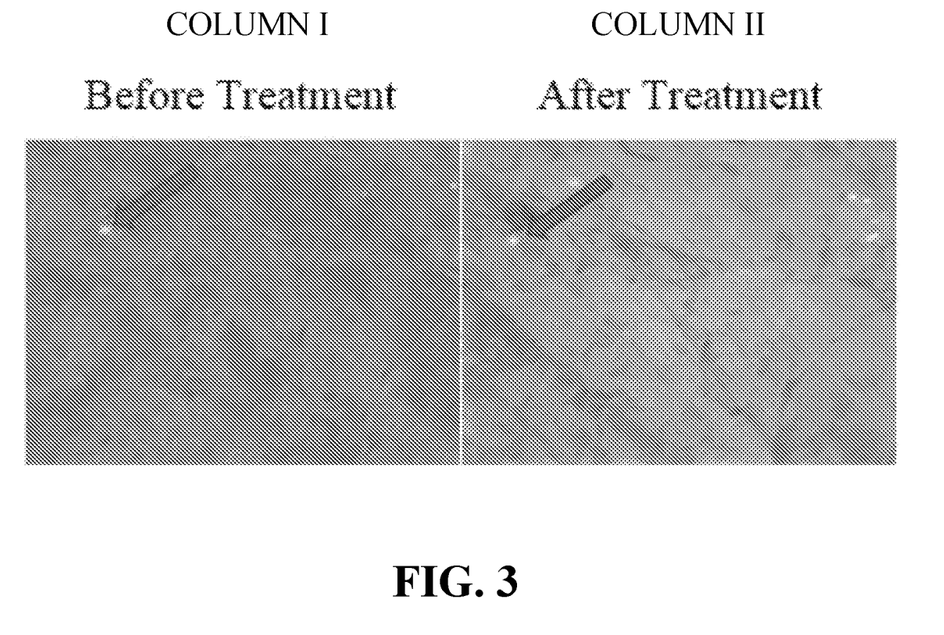
FIG. 3 is a series of electron micrographs showing a polished surface of aluminum test samples before treatment with a PEC compound (left column I) and after treatment with a PEC compound (right column II).

In FIG. 3, there is shown several electron micrographs of a polished surface of an aluminum substrate, Al6111, before treatment with QM1326 (left column I) and after treatment with QM1326 (right column II). Asterisks and arrows are inserted into the image for feature location. The scale bar for the micrographs is 5 microns. FIG. 3 shows that, with the addition of QM1326 to the adhesive, residual organic contamination is removed from the metal. This organic contamination removal can be best visualized with images where delocalized dark regions are found before QM1326 exposure, but not after QM1326 exposure. If the difference observed in the images is due to the interaction of QM1326 with the surface and not from additional cleaning (after exposure the surface was washed with water and acetone), then the images indicate that treatment with QM1326 may etch and clean the aluminum. A second observation from the QM1326 treated aluminum surfaces is that after treatment a series of small dark regions appear on the treated surface. These small dark regions can be best visualized in the lower right corner of the images of FIG. 3. Similar areas were observed in a previously examined sample (not shown), and suggests pitting of the surface which supports the phenomena of QM1326 etching the aluminum surface.

With reference to FIG. 3, Table VI and Table VII, it can be observed that exposure of Al6111 to various PECs: (i) decreases the aluminum oxide layer thickness (see Table VI), (ii) produces a thin phosphorous-containing layer on the Al (see Table VII), (iii) removes residual carbon-rich surface material (see FIG. 3), and (iv) etches the surface producing small "pits" (see FIG. 3). It is believed that the above processes also occur when PECs are applied as a formulated ingredient in an adhesive.

TABLE VI

XPS Weight Percent and Oxide Thickness for Aluminum Treated Surfaces

| Sample | Concentration (wt %) | Oxide (nm) |
|---|---|---|
| Control | — | 5.7 |
| Water Washed | — | 5.7 |
| Phosphoric Acid | 1% | 2.2 |
| Phosphoric Acid | 2% | 2.5 |
| Phosphoric Acid | 5% | 2.5 |
| Phosphonic Acid | 1% | 2.5 |
| Phosphonic Acid | 2% | 2.3 |
| Phosphonic Acid | 5% | 2.3 |
| Phenyl Phosphonic Acid | 5% | 4.1 |
| Diphenyl Phosphite | 1% | 2.4 |
| Diphenyl Phosphite | 2% | 2.4 |
| Diphenyl Phosphite | 5% | 2.5 |
| QM1326 | 1% | 2.8 |
| QM1326 | 2% | 2.7 |
| QM1326 | 5% | 2.6 |
| QM1326 | Undiluted | 3.0 |

TABLE VII

XPS Elemental Weight Percent (Forced to 100% Neglecting Contributions from H and He) for Acetone Washed Exposed Aluminum After Lap Shear Test

| | | C (total) | O | Al (total) | Si | N | Ca | Cl | Mg | P | S | Zn |
|---|---|---|---|---|---|---|---|---|---|---|---|---|
| QM1326 Initial Aluminum | Avg | 22.0 | 36.7 | 28.3 | ND[a] | 1.5 | 1.5 | 1.9 | 6.8 | ND | 0.8 | 0.4 |
| Acetone Washed | Stdev | 1.2 | 0.8 | 0.6 | ND | 0.1 | 0.1 | 0.4 | 0.4 | ND | 0.2 | 0.4 |
| QM1326 Initial Aluminum | Avg | 21.2 | 38.4 | 27.4 | 0.3 | 0.7 | 0.9 | ND | 7.5 | 2.7 | 0.6 | ND |
| Acetone Washed | Stdev | 2.3 | 0.8 | 1.3 | 0.5 | 0.2 | 0.2 | ND | 1.0 | 0.3 | 0.2 | ND |

[a]"ND" = not detected

The results of the above tests also indicate that Al treated with QM1326 and soaked in 3% NaCl provides no corrosion benefits relative to a Control. Therefore, improved corrosion resistance appears related to improved adhesive/barrier properties between the metal and 1620US. Furthermore, aluminum substrates modified by aggressive solvent cleaning or abrasion with sandpaper provide similar benefits to those observed with the use of PECs (see Tables IV and V).

This indicates that surface modification plays a significant role in corrosion resistance improvements. Also, the PECs are observed to interact with bisphenol A diglycidyl ether or BADGE via ring-opening of the epoxide group forming ester linkages with phosphate groups. In the case of QM1326 and SIPOMER PAM 4000, the reaction leads to the formation of a modified epoxy with esters containing acrylate components. It may be theorized that these newly formed organophosphates play a role in improving corrosion resistance. And, exposing Al6111 to an epoxy (e.g., bisphenol A diglycidyl ether) with the PEC additive alters the chemistry of the metal. Specifically, Mg, C, Ca and Na are removed from the metal surface. This strongly supports that PECs can interact with a metal surface when delivered with an epoxy organic delivery system.

What is claimed is:

1. An adhesive composition comprising
   (I) 40-65 wt % of an epoxy-based adhesive polymer; and
   (II) a phosphorous element-containing compound, which is a mixture of phosphoethyl methacrylate monoester, phosphoethyl methacrylate diester, phosphoric acid, and methyl methacrylate; and
   (III) an epoxy curing catalyst.

2. The adhesive composition of claim 1, wherein the epoxy-based adhesive polymer is a mixture comprising: (a) a curable epoxy compound or a combination of two or more curable epoxy compounds; (b) one or more reactive urethane group- and/or urea group-containing polymers having a number average molecular weight of up to 35,000, at least one polyether and/or diene rubber segment having a weight of at least 1,000 atomic mass units, and capped isocyanate groups, (c) at least one epoxy curing catalyst, and (d) a curing agent.

3. The adhesive composition of claim 1, wherein the epoxy-based adhesive polymer is bisphenol A diglycidylether.

4. The adhesive composition of claim 1, wherein the epoxy-based adhesive polymer is a urea toughening polymer.

5. The composition of claim 1, wherein the amount of epoxy-based adhesive polymer is from about 40 weight percent to about 60 weight percent.

6. The composition of claim 1, wherein the amount of phosphorous element-containing compound is up to about 20 weight percent.

7. The composition of claim 1, wherein the amount of phosphorous element-containing compound is from about 0.1 weight percent to about 5 weight percent.

* * * * *